(12) United States Patent
Katsurabayashi (10) Patent No.: US 7,806,334 B2
(45) Date of Patent: Oct. 5, 2010

(54) SYSTEM, METHOD, AND STORAGE MEDIUM FOR WORKFLOW MANAGEMENT

(75) Inventor: Hiroshi Katsurabayashi, Kawasaki (JP)

(73) Assignee: Fuji Xerox, Co., Ltd., Tokyo (JP)

( * ) Notice: Subject to any disclaimer, the term of this patent is extended or adjusted under 35 U.S.C. 154(b) by 1071 days.

(21) Appl. No.: 11/492,171

(22) Filed: Jul. 24, 2006

(65) Prior Publication Data

US 2007/0136121 A1    Jun. 14, 2007

(30) Foreign Application Priority Data

Dec. 9, 2005    (JP) ............................ 2005-355682

(51) Int. Cl.
*G06K 7/10*    (2006.01)
(52) U.S. Cl. ................ 235/454; 235/494; 235/375
(58) Field of Classification Search ............ 235/454, 235/494, 487, 375
See application file for complete search history.

(56) References Cited

U.S. PATENT DOCUMENTS

| | | | |
|---|---|---|---|
| 6,910,843 B2* | 6/2005 | Saw et al. | 412/19 |
| 2005/0028073 A1* | 2/2005 | Henry et al. | 715/500 |
| 2005/0165747 A1* | 7/2005 | Bargeron et al. | 707/3 |

FOREIGN PATENT DOCUMENTS

| | | |
|---|---|---|
| JP | 11143980 | 5/1999 |
| JP | 2004192501 | 7/2004 |
| JP | 2004265140 | 9/2004 |

OTHER PUBLICATIONS

Chinese Office Action and English translation of same mailed on Mar. 30, 2010, relating to corresponding Chinese Application No. 200610153401.6.

* cited by examiner

*Primary Examiner*—Edwyn Labaze
(74) *Attorney, Agent, or Firm*—Gauthier & Connors LLP (57) ABSTRACT

A workflow management system includes a print control section that, upon receiving an instruction to print an electronic document used in a workflow, causes a printing device to print, together with the electronic document, identification information for identifying the workflow or an activity of the workflow, the workflow or the activity is a destination to which an image resulting from reading a printed result of the electronic document is to be taken, an identifier recognition section that recognizes the identification information read by an image reading device, and an association section that associates the image of the electronic document read in association with the identification information by the image reading device or data resulting from a process performed on the image with the destination identified by the recognized identification information.

17 Claims, 8 Drawing Sheets

| No | WORKFLOW ID | OUTPUT ACTIVITY ID | DESTINATION ACTIVITY ID | PRINTER ID | OUTPUT TIME | OUTPUT PERSON ID | RESPONSIBLE PERSON ID |
|---|---|---|---|---|---|---|---|
| 1 | 1 | 1 | 2 | 3 | 2005/6/27 10:43 | 5001 | 511 |
| 2 | 2 | 2 | 2 | 3 | 2005/6/30 13:24 | 5002 | 512 |
| 3 | 3 | 10 | 2 | 3 | 2005/8/5 12:24 | 5003 | 513 |
| 4 | 4 | 10 | 2 | 4 | 2005/8/5 13:01 | 5003 | 514 |
| 5 | 5 | 10 | 2 | 5 | 2005/8/5 13:08 | 5003 | 515 |
| 6 | 6 | 10 | 2 | 4 | 2005/8/10 9:32 | 5003 | 514 |

SYSTEM, METHOD, AND STORAGE MEDIUM FOR WORKFLOW MANAGEMENT

BACKGROUND

1. Technical Field

The present invention relates to a method and system for workflow processing, and more particularly to a technique for handling a printed result of an electronic document used for a workflow.

2. Related Art

Workflow support systems using computer networks have been widely used for improving operational efficiency and the like. In such a workflow support system, a document on which an operation is performed is generally circulated in the form of an electronic document to persons in charge.

Conventional workflow support systems are premised on exchange of electronic documents over an information system, such as a network. A person in charge may output the electronic document in the form of a hard copy, but no known system gives due consideration to returning the hard copy including handwriting thereon back into the workflow. For example, although the person in charge can scan the hard copy and register a file of a scanned image of the hard copy including the result of his/her activity, this requires troublesome operations, including manual registration of the scanned image file with the system.

SUMMARY

According to one aspect of the present invention, there is provided a workflow management system including a print control section that, upon receiving an instruction to print an electronic document used in a workflow, causes a printing device to print, together with the electronic document, identification information for identifying the workflow or an activity of the workflow, the workflow or the activity is a destination to which an image resulting from reading a printed result of the electronic document is to be taken, an identification information recognition section that recognizes the identification information read by an image reading device, and an association section that associates the image of the electronic document read in association with the identification information by the image reading device or data resulting from a process performed on the image with the destination identified by the recognized identification information.

BRIEF DESCRIPTION OF THE DRAWINGS

These and other aspects of the disclosure will become apparent from the following description read in conjunction with the accompanying drawings, wherein the same reference numerals have been applied to like elements and in which.

DETAILED DESCRIPTION

An embodiment of the present invention will be described with reference to the accompanying drawings.

Although unrelated to a workflow, there are known systems for printing an electronic document together with an ID (identification information) thereof, and recognizing the ID to acquire and print data of the electronic document upon copying the printed result, to thereby achieve a crisp and clear duplication result.

Such a method of using an ID of an electronic document causes a problem when the same document is used in different workflow instances. More specifically, although the printed result is read to recognize the ID, the system cannot determine with which of the different workflow instances the read result should be registered, because the printed results of the electronic document are assigned the same document ID. Further, when a workflow branches into multiple flows during the process and the same document is printed multiple times and returned to the workflow after multiple persons have performed tasks thereon, the system cannot determine from only the document ID to which branch of workflow the read image should be returned, because such multiple printed documents are assigned the same document ID.

Figure 1:
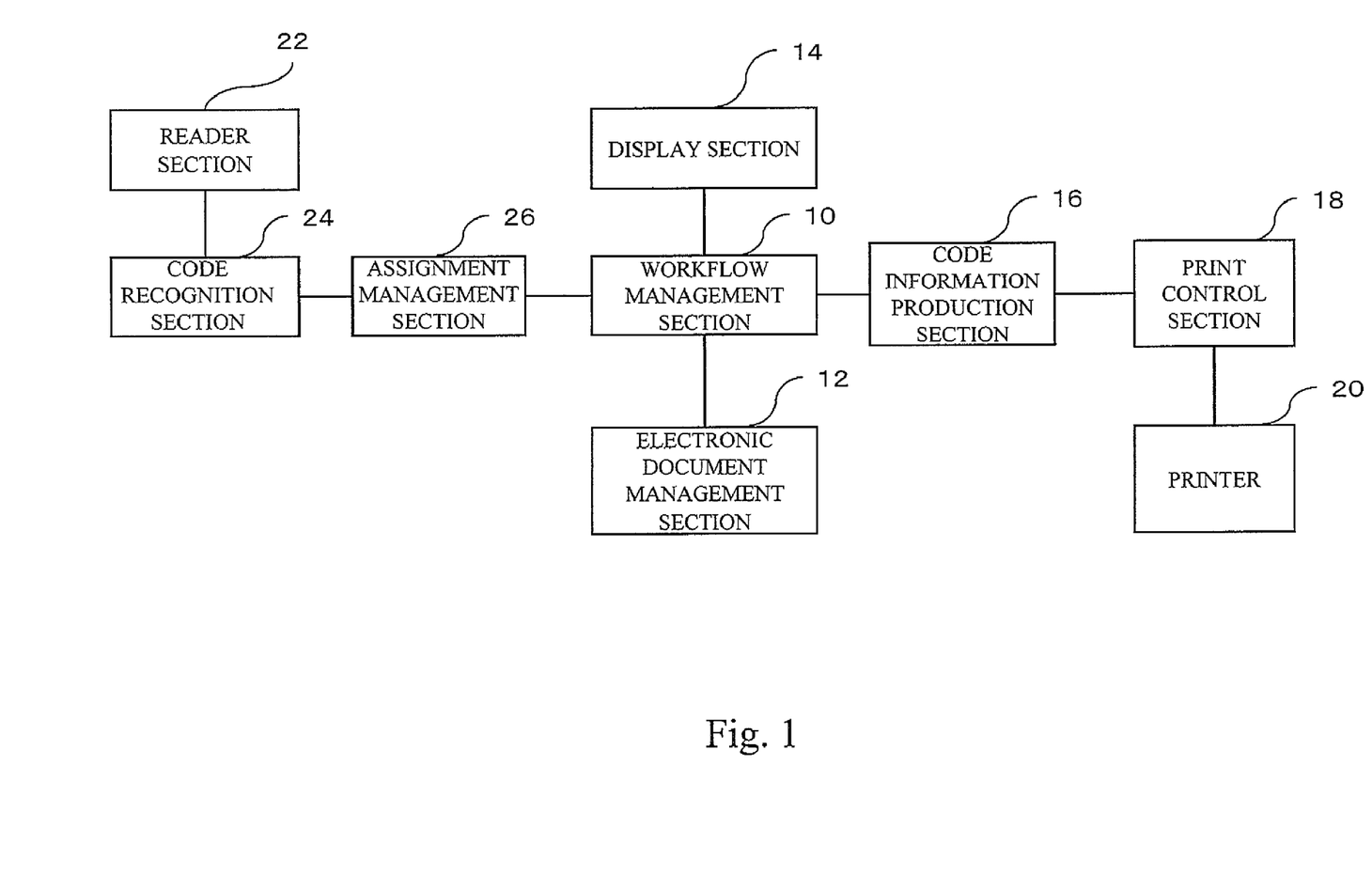
FIG. 1 shows a functional configuration of a workflow support system.

A schematic configuration of a workflow support system according to the present embodiment will first be described with reference to FIG. 1. A workflow management section 10 produces and performs each workflow instance in accordance with a flow definition of a workflow. For example, for an invoice processing flow, an invoice is individually formed for each case, and issued after receiving necessary approvals. In this case, an instance for processing each invoice is produced and executed in accordance with the flow definition of invoice processing, thereby executing the workflow for that invoice. Typical examples of the processes performed by the workflow management section 10 for workflow management include, for example, management of circulation of an electronic document, identification of the person performing an activity, and notification to the person in charge of the activity or related parties.

An electronic document management section 12 holds and manages a group of electronic documents used in a workflow. In a workflow, a document is, for example, circulated among a staff, and is affixed with comments, seals, or signatures when necessary. Some documents are needed during each activity. Thus, electronic data of documents used in a workflow are managed by the electronic document management section 12. The section 12 also manages access rights to each of the managed electronic documents of the group in accordance with information provided by the workflow management section 10. Generally, access to the electronic document used in a workflow instance or each activity therein is granted only to the person in charge of the workflow instance or activity and the related parties. Because the workflow management section 10 manages information on the person in charge of each workflow instance and activity and the related parties, the electronic information management section 12 manages the access rights to each electronic document on the basis of such information.

A display section 14 displays a variety of screen images produced by the workflow management section 10.

The workflow management section 10, the electronic document management section 12, and the display section 14 described above are provided in conventional workflow management systems, and existing devices can be used.

The workflow management section 10 provides users with a user interface for issuing an instruction to print an electronic document used in a workflow instance or an activity. For example, a GUI (graphical user interface) for issuing an instruction to print out an electronic document used in a particular activity is displayed on, for example, a user interface screen for the activity. The electronic documents used in an activity are, for example, a document requested to be viewed in the activity, a document on which an operation result of the activity is written, and the like. The electronic document reflecting the operation result of the activity is generally used in a later activity, and therefore a user interface for printing out the resulting electronic document may be provided on the activity screen or the like.

Upon receiving a printout instruction from a user through such a user interface, the workflow management section 10 instructs a code information production section 16 to produce a code image to be printed together with the electronic document. The code production instruction includes information to be embedded in the code image.

The information to be embedded in the code image includes a workflow ID uniquely indicating a workflow instance to which the electronic document belongs. The workflow ID is an ID assigned by the workflow management section 10 when a workflow instance is activated, and used for uniquely identifying that workflow instance. Even multiple instances produced from the same workflow definition have different values. Because the instruction to print out an electronic document is made on the user interface screen for the activity in the workflow instance, the workflow management section 10 knows the ID of that particular workflow instance, and therefore can embed the ID in the code production instruction. Further, information, such as the name or identification information of the person to receive the printed result of the electronic document and the code image (the person to perform an operation on the printed result), may be printed together with the code image, thereby helping the person issuing the printing instruction in correctly passing the printed result to the person who should receive it.

Upon receipt of the code production instruction, the code information production section 16 produces a code image in a predetermined format indicating the workflow ID included in the instruction. For a code image format, a variety of codes, such as a QR code, a barcode, and a two-dimensional barcode, can be used, and the mechanism of the present invention does not depend on the format of the code image.

A print control section 18 receives an electronic document and the code image to be printed from the code information production section 16, and controls a printer 20 to print out these two in association with each other. As one example, the code image is printed so as to be superimposed on the electronic document. For example, the code image can be printed over a blank space in the electronic document by, for example, placing the code image over a margin area for printing a header or a footer. Also, when a known printer provided with a channel for an invisible color material (such as a toner-absorbing visible light and reflecting infrared radiation) is used, the print control section 18 may supply print data for the electronic document to ordinary, visible color material channels and the code image to the invisible color material channel, thereby achieving a printout result in which the code image invisible to the human eye is printed onto the electronic document image.

As an alternative example, the print control section 18 controls the printer 20 to print out the code image on a sheet separate from the electronic document by, for example, causing the printer 20 to output a sheet on which the code image is printed as a cover sheet for the printed result of the electronic document. For a document which does not allow inclusion of information other than preagreed information, such as a contract document, the code image may be printed on a separate sheet of paper. For such a case, the sheet where the code image is printed can have printed thereon description of operation for reading the simultaneously-printed electronic document and putting it into the workflow. Printed operation descriptions may include instructions, such as "Place this sheet (code image) on top of the document to be loaded, set the sheets in the automatic document feeder, and press the start button" or "Load this sheet before the document," or a descriptive drawing depicting the operation.

Alternatively, description of the operation to be performed by the person receiving the electronic document may be printed together with the code image. The description of the operation may be preregistered with the workflow management section 10, and supplied to the print control section 18 when necessary.

By means of the above-described configuration, the document used in a workflow instance is printed out. The user who issued the printing instruction hands the printed result of the electronic document and the code image to an appropriate person in charge (that person may be himself/herself). The person receiving the printed result performs the appropriate operation (such as writing or signing) on the printed result, and causes a reader section 22 of the workflow support system to read the result in order to return it to the workflow instance.

The reader section 22 optically reads an image on a medium, such as a sheet of paper, and outputs data of the read image.

A code recognition section 24 extracts the code image from the image data supplied from the reader section 22, and decode the code image in accordance with a predetermined coding scheme, thereby obtaining character string information indicated by the code image. The obtained character string information includes a workflow ID. The extracted workflow ID is passed to an assignment management section 26. The code recognition section 24 passes to the assignment management section 26 the image data (including the image read from the printed result of the electronic document) supplied from the reader section 22. In a system employing a configuration where the code image and the electronic document are printed on separate sheets, the code recognition section 24 provides the assignment management section 26 with the image read from the printed result of the electronic document together with the recognition result of the code image.

The assignment management section 26 provides the workflow management section 10 with the read image data of the electronic document supplied from the code recognition section 24 as an input to the workflow instance specified by the workflow ID received from the code recognition section 24. Upon receiving the data, the workflow management section 10 inputs the image data to the workflow instance specified by the ID. This restarts the flow of this particular instance. A character recognition process may be performed on the input image data, so that the content written on the document may be converted to text data and embedded into the electronic document when necessary.

Thus, according to the present system, the code image of the workflow ID specifying the workflow instance to which the electronic document belongs is also printed when the electronic document is printed. When the printed result of the electronic document including handwriting or the like is returned to the workflow, the workflow ID is recognized from the printed result of the code image to specify the workflow instance to which the document is to be returned. As a result, a user can return the printed result of an electronic document to an electronic workflow instance through a simple operation of causing the reader section 22 to read the printed result if the code image is printed overlapping the electronic document, or a simple operation of causing the reader section 22 to read the printed result of the code image in association with the printed result of the electronic document (by, for example, consecutively reading the two within a predetermined period of time) if the electronic document and the code image are printed on separate sheets.

Figure 2:
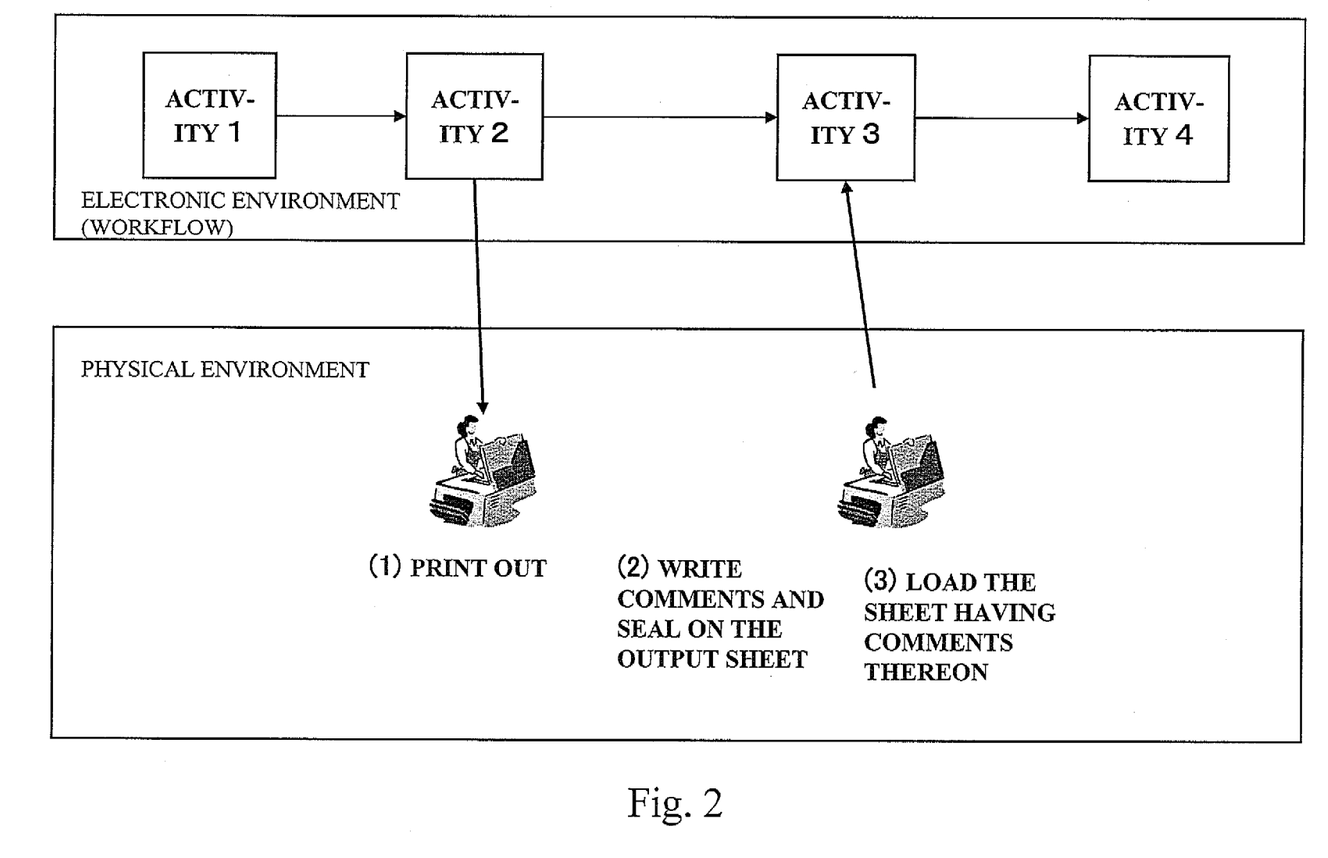
FIG. 2 is a view for describing the relationship between an electronic workflow and a printed material in a physical environment.

This system functions effectively when, for example, the workflow stream is serial, as illustrated in FIG. 2. More specifically, when the electronic document of the operation result of a certain activity 2 is printed out (1), the workflow management section 10 places this particular workflow instance in a suspended state. A user receiving the printed result of the electronic document (and that of the code image) performs an operation, such as writing necessary information, affixing his/her signature, and sealing, on the printed result (2), and causes the reader section 22 to read the sheet of the operation result (3). The code recognition section 24 and the assignment management section 26 then specify the workflow instance to which the image resulting from reading the operation result sheet is to be returned. The workflow management section 10 recognizes that the instance is suspended when the operation result of the activity 2 is output, and, therefore, upon receipt of the image from the assignment management section 26 with the specified workflow ID, determines that the image is the operation result of the activity 3 following the activity 2, to thereby take in the image. As a result, the stream of the workflow having transitioned to the physical world by printing returns to the electronic workflow.

Although FIG. 2 shows an example in which the operation result of the activity 2 is printed out, a person in charge of the activity 2 can print the electronic document to work on for the activity 2 (usually the output result of the activity 1), perform an operation on the printed result, and return it to the workflow instance by himself/herself. In such a case, the workflow management section 10 may suspend the activity 2 in a "working state" when the electronic document is printed out, and recognize and take in the read image as the operation result of the activity 2 when it is provided from the assignment management section 26.

In order to prevent an unauthorized person who obtains the printed result of an electronic document from returning the result to the workflow, the reader section 22 may prompt a user to input authentication information. The authentication information the user is requested to input may be, for example, a pair consisting of user ID and password. Alternatively, the reader section 22 may be provided with a card reader for reading an ID card (such as an IC card or a magnetic card) of the user, so that the card reader acquires information in the IC card. The reader section 22 or a user authentication system connected thereto performs user authentication on the basis of the authentication information. If user authentication fails, a reading operation at the reader section 22 itself is prohibited, or, although the reading operation is permitted, returning the read result to the workflow is prohibited. If user authentication succeeds, the user ID is supplied to the workflow management section 10 through the assignment management section 26 together with the code recognition result and the read image. The workflow management section 10 determines whether or not the person in charge of the activity, into which the read image is to be incorporated, in the workflow instance specified by the code matches the user specified by the user ID, and if it matches, approves the incorporating operation, and if not, cancels the incorporating operation.

Although in the above example information, such as a workflow ID, is depicted as a code image, such as a QR code, the present invention is not limited thereto, and the information may be expressed as a character string. In such a case, the code recognition section 24 can obtain the contents of the code through character recognition.

The above-described embodiment may be unable to fully cope with the case in which a workflow is divided into multiple branches. Below is described an example for coping with such a situation.

More specifically, in this example, the code information production section 16 produces a code image including a "destination activity ID" for uniquely specifying the activity into which the image obtained by reading the printed result of an electronic document should be incorporated. The activity ID may be, for example, a combination of the workflow instance ID and identification information for specifying this activity in the instance. Alternatively, a unique ID may be assigned for each activity in the system regardless of the workflow instance ID.

When the electronic document for which a printout instruction is issued from a certain activity screen reflects the result of the activity; i.e., in the case of the electronic document on which an operation is to be performed in a later activity, the destination activity is that "later activity." Because the "later activity" in which a process is performed on the processed result of a certain activity is determined in the workflow instance, the workflow management section 10 can inform the code information production section 16 of the ID of the "later activity."

Figure 3:
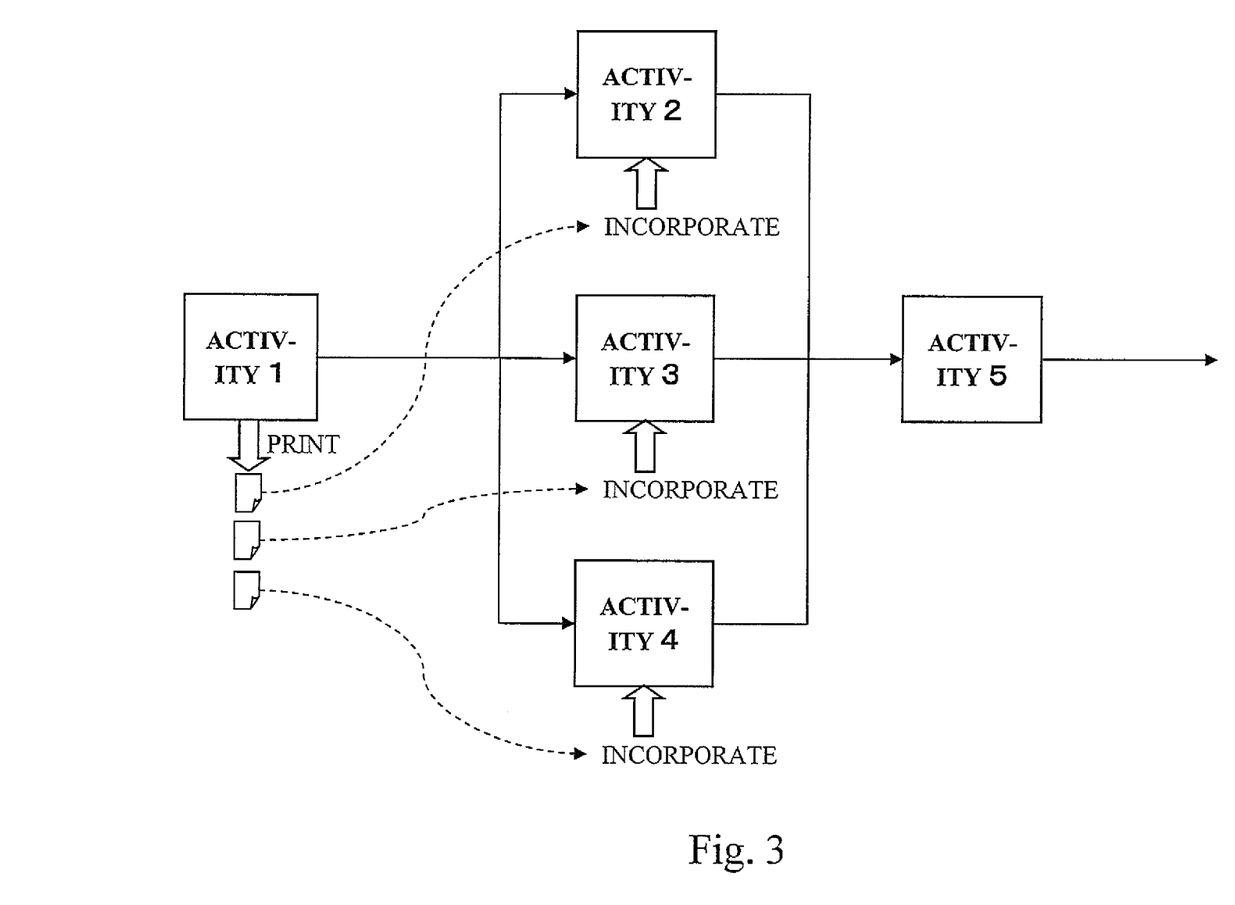
FIG. 3 is a view for describing a workflow branching into multiple flows.

As an example, consider a case where an instruction to print an electronic document reflecting the operation result of the activity 1 is issued when the flow following the activity 1 is branched into three activities; namely, activities 2, 3, and 4, as shown in FIG. 3. The workflow management section 10 recognizes from the workflow instance information that these three activities; i.e., activities 2, 3, and 4, follow the activity 1; produces a code image for each of the activities 2, 3, and 4; and instructs the code information production section 16 and the print control section 18 to print out each code image together with the electronic document. As a result, hard copies of the electronic document accompanied with the code images of different destination activity IDs are output. Note that information indicating the person in charge of each destination activity (such as the name of that person) may also be printed together with each code image so as to reduce the likelihood that the user printing the document hands the printed result to an inappropriate person. Upon acquiring the printed result, each of the persons in charge of the respective activities 2, 3, 4 performs a necessary operation on the printed result, and causes the reader section 22 to read the operation result. As a result, the operation results of the activities 2, 3, and 4 are put into the workflow instance, thereby enabling execution of the next activity 5.

Although in the example illustrated in FIG. 3 the documents for the parallel activities 2, 3, and 4 following the activity 1 are simultaneously printed out upon issuance of the instruction to print the document reflecting the operation result of the activity 1, the present invention is not limited to such a case, and a user interface for issuing a printing instruction for each of the following activities may be provided.

Further, although in the example illustrated in FIG. 3 the document resulting from an operation on the activity is printed out, for printing out the document on which an operation is to be performed in an activity, a code image including the ID of the activity itself as a destination activity ID should be printed.

Next, below is described an example achieving a further control by incorporating a greater variety of information to the code image printed in association with an electronic document.

More specifically, in this example, the name of a server, for example, on which the workflow management section 10 operates is embedded in a code image. The server name should be uniquely assigned on a network (LAN or Internet) to which the present workflow support system is connected. As a result, the code recognition section 24 reading the code image can recognize which workflow management section 10 manages the image in the printed result of the simultaneously-read electronic document, so that the image can be transferred to the server on which the workflow management section 10 runs. Embedding the server name into the code image is useful when multiple workflow management sections 10 are provided on the network.

Instead of embedding the server name into the code image, the network may include a location resolution server for resolving, from either or both of the workflow ID and the destination activity ID, the location of the workflow management section 10 managing the workflow to which the read result of the document is incorporated, so that the code recognition section 24 can locate the workflow management section 10 using such a location resolution server.

As another information item to be embedded into the code image, there is employed a source activity ID for uniquely specifying the activity in which an instruction to print out the electronic document is issued (this is also known to the workflow management section 10). By embedding the source activity ID into the code image, the workflow management section 10 receiving the recognition result of the code image can identify which activity has performed the input of each document when, for example, documents printed by multiple activities are put into the same destination activity.

A printer ID uniquely specifying the printer 20 to which the electronic document is to be output may be embedded in the code image. For example, the printing operation can be controlled so as to allow only limited printers among the group of printers on the network to print the electronic document used in a workflow, and to cancel the operation of putting the image read together with the code image into the workflow instance if the code image does not include the ID of any printers allowed to print the image.

Further, date and time information (output time) as to when the printing instruction is issued may be embedded in the code image. The output time information can be used, when for some reason the document to be put into the same destination activity is printed multiple times, for determining which of the multiple printed results is to be put into the particular destination activity. For example, the electronic document may be reprinted when the printed result of the document is discarded due to paper jam in the printer 20, or when a proper printed result is lost. In such a case, there must be avoided the case where an unauthorized person acquires and puts the discarded paper or lost printed result back into the workflow. For this purpose, the workflow management section 10 need simply control the printing operation so that the image of the document read together with the code image is put into the workflow instance only when, for example, the output time recognized from the code image is the latest among the printouts of the electronic document of interest. As another example, the earliest printout of all the multiple printed results of the same electronic document may be regarded as the original, to thereby prohibit the other printed results from being put into the workflow, and the output time information can be used also in such a case. Although in the above-described example the latest or the first printed result is selectively put back into the workflow, the present invention is not limited to such an example, and the "output time" information may be used as one determination standard for selectively putting one of the printed results of the same electronic document back into the workflow.

Alternatively to, or in addition to, the output time information, the number of times the same electronic document is output (the workflow management section 10 receiving the printing instruction also acquires this information) may be embedded into the code image. As a result, the information on how many times the document read together with the code image is printed can be acquired, thereby achieving control so as to identify the printed result satisfying the predetermined conditions, such as the latest or the first printed result, and selectively put it back to the workflow.

Further, instead of the number of times the same electronic document is output, the total number of times electronic documents are output by the printer 20 (the number is incremented every time the printer 20 outputs an electronic document, regardless of which electronic document is output) may be embedded into the code image to thereby achieve similar control.

The ID of the user who has issued the instruction to print out an electronic document may be embedded in the code image as an output person ID. Because the instruction to print an electronic document is issued by a user after accessing the activity in the workflow instance, the workflow management section 10 can recognize the user as the output person, and inform the code information production section 16 of the ID as the output person ID.

Further, a responsible person ID specifying the person who will be in charge of an operation performed on the printed-out document (i.e. the person in charge of the destination activity) may be embedded in the code image. Similar to the destination activity ID, the responsible person ID is also known to the workflow management section 10 by the time the electronic document is output. By embedding the responsible person ID into the code image, the workflow management section 10 or the code recognition section 24 recognizing the code image can determine whether or not the person who caused reading of the code image corresponds to the responsible person ID, thereby judging whether or not the input is from the appropriate person in charge. Such a determination may be achieved by providing the reader section 22 with a component for entering authentication information of the user.

Figure 4:
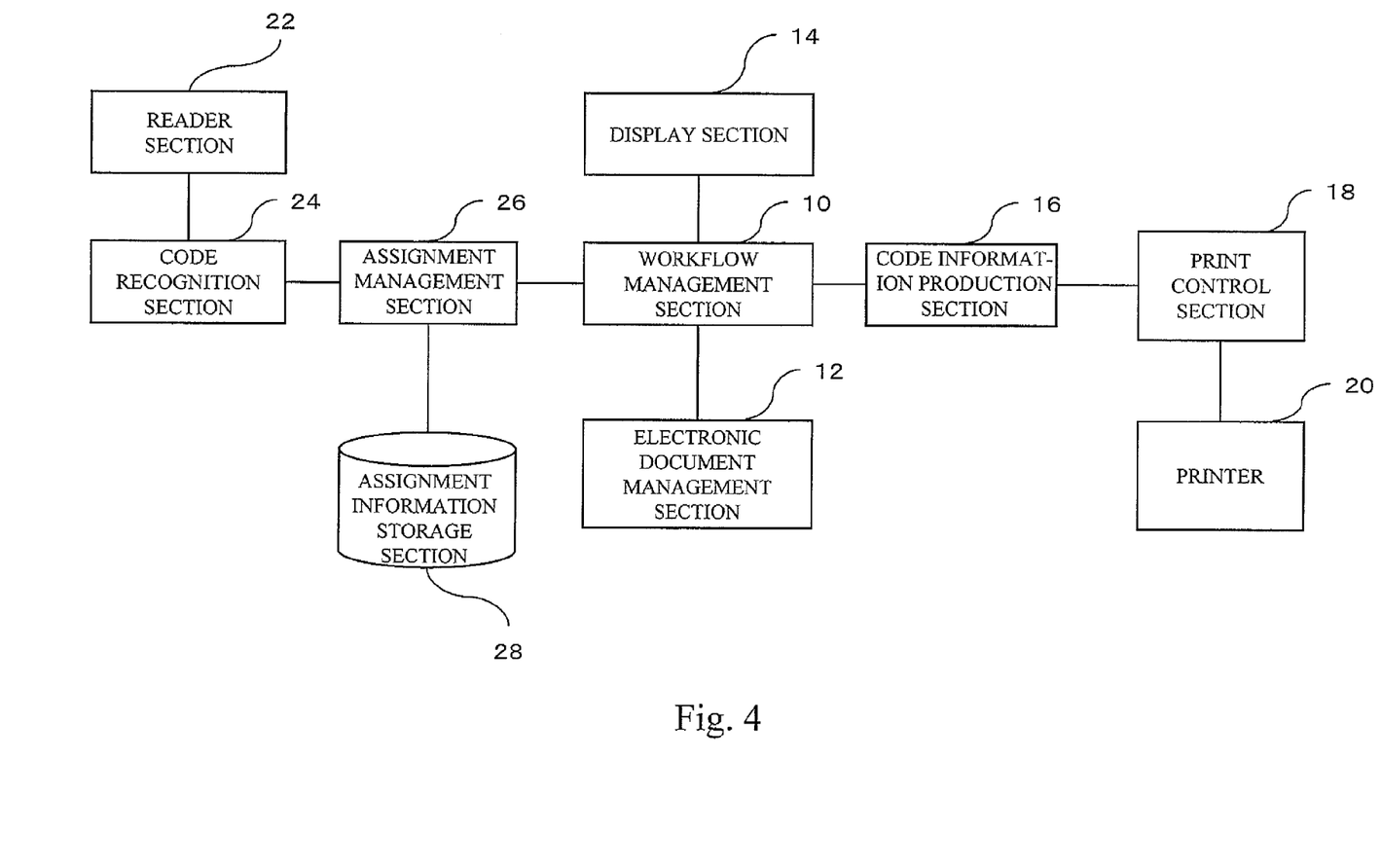
FIG. 4 shows another example of a functional configuration of the workflow support system.

FIG. 4 shows an example system configuration in which information other than the workflow ID or the destination activity ID is used. In this example, an assignment information storage section 28 is provided in addition to the system configuration of FIG. 1. The assignment information storage section 28 is a database storing a variety of types of information described above acquired when an electronic document is printed. The workflow management section 10 registers, for example, information similar to that supplied to the code information production section 16 with the assignment information storage section 28 when an electronic document is printed.

Figure 5:
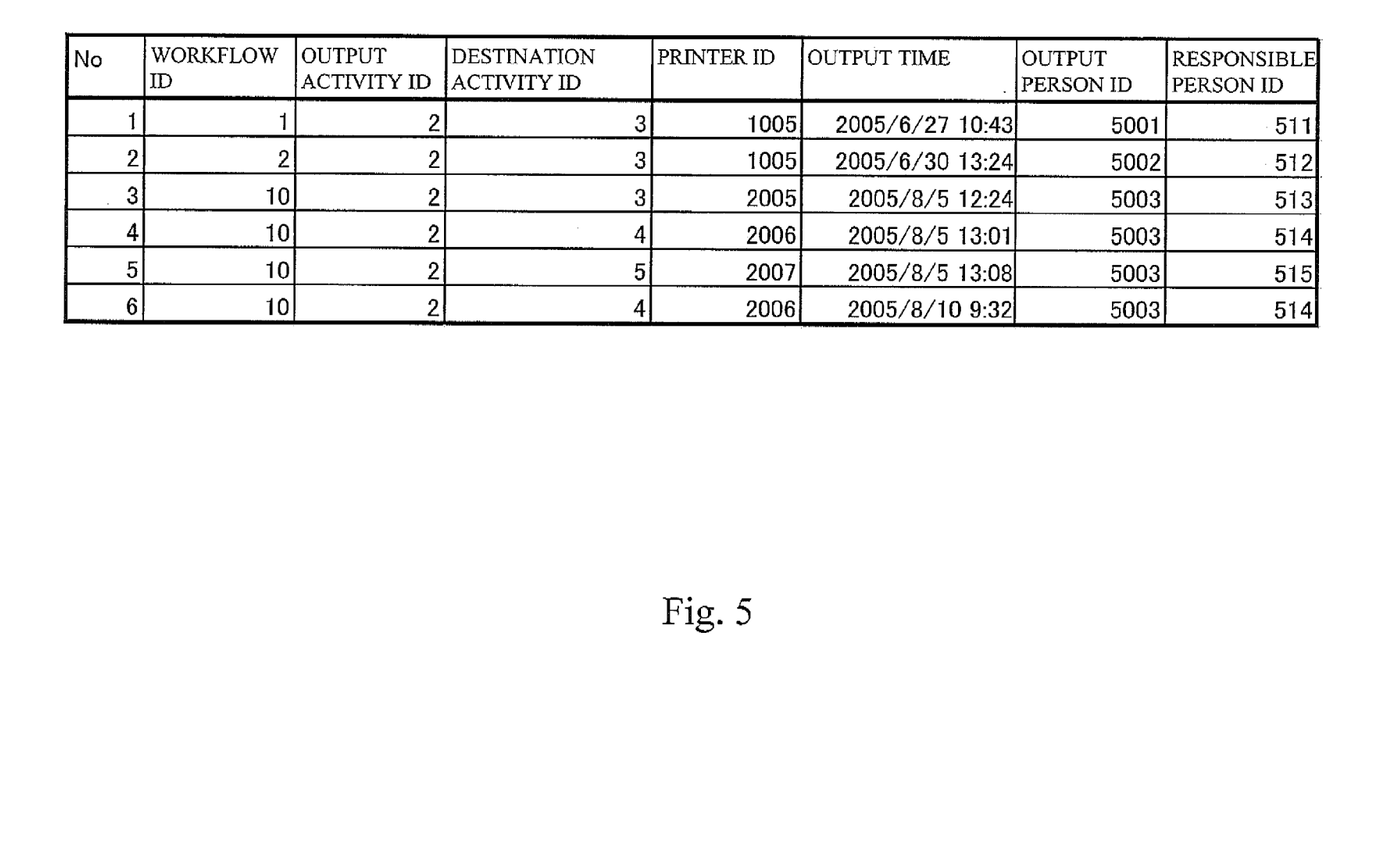
FIG. 5 shows example data contents held in an assignment information storage section in the system of FIG. 4.

FIG. 5 shows example data contents held in the assignment information storage section 28. A row in this example corresponds to a record related to one printout operation. In this example, information registered in association with an identification number "No." of a record include the workflow ID, the output activity ID, the destination activity ID, the printer ID, the output time, the output person ID, and the responsible person ID. The identification number of a record is uniquely assigned every time the workflow management section 10 requests the assignment information storage section 28 to register data. The other information items are used as described above. Note that the information items shown in FIG. 5 are given only by way of example. The assignment information storage section 28 need not hold all the items shown in FIG. 5, and may hold information items other than those illustrated.

Figure 6:
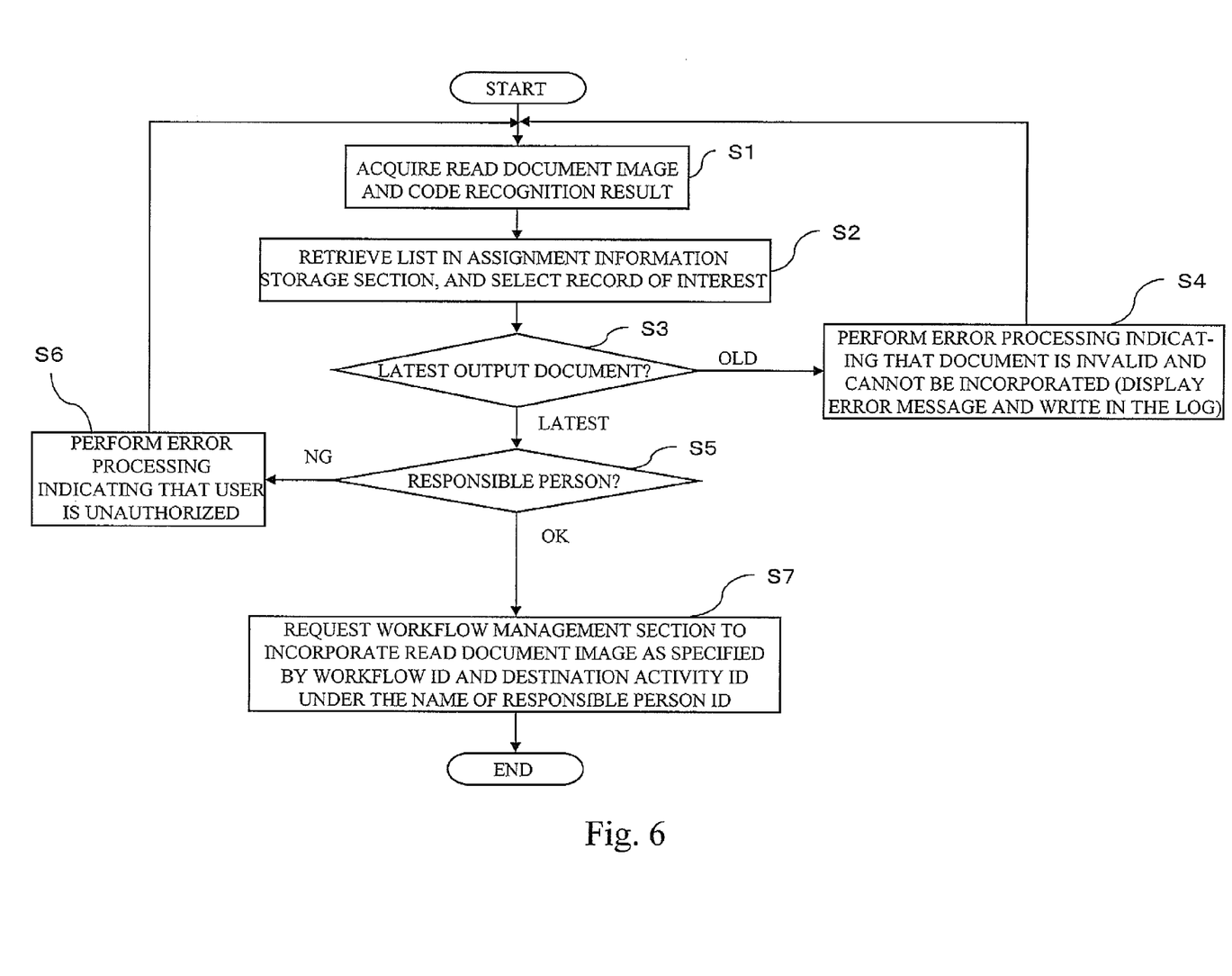
FIG. 6 is a flowchart of an exemplary process procedure performed by the assignment management section in the system of FIG. 4.

An exemplary processing procedure performed by the assignment management section 26 in this system is shown in FIG. 6. The following describes an example in which the information items shown in FIG. 5 are all included in a code image (except for the record identification number).

When a user causes the reader section 22 to read a code image and the printed result of a document, the code recognition section 24 recognizes the code image, along with the information included in the code image, such as the workflow ID and the output time, and supplies such a recognition result to the assignment management section 26. The assignment management section 26 receives the image read by the reader section 22 and the recognition result of the code image (S1), and retrieves from the assignment information storage section 28 the record having the contents coinciding with the recognition result of the code image (S2). The assignment management section 26 acquires from among the records stored in the assignment information storage section 28 the records having the workflow ID, the output activity ID, and the destination activity ID corresponding to the code recognition result, and determines whether or not the record retrieved in step S2 has the latest output time among the acquired records (S3).

Because this example employs a rule in which only the latest one of the printed results of the same electronic document is taken, error processing is performed if the record is not the latest (S4). In the error processing, an error message stating, for example, "Invalid document. Reading canceled" is displayed on the user interface screen of the reader section 22. Alternatively, a record indicating that a reading operation is canceled because the document is invalid may be placed in the log managed by itself.

When the read document is determined to be the latest, the assignment management section 26 determines whether or not the user specified by the user authentication information input to the reader section 22 agrees with the responsible person ID recognized from the code image (i.e. the responsible person ID in the record held by the assignment information storage section 28) (S5), and, if not, error processing is performed, in which a message, such as "Unauthorized user input. Registration canceled," is displayed on the user interface screen of the reader section 22 (S6). If the user ID agrees with the responsible person ID, a request is made to the workflow management section 10 to place the image of the document read by the reader section 22 into the activity specified by the workflow ID and the destination activity ID recognized from the code image (S7). For this step, the responsible person ID may be specified to the workflow management section 10 as the person in charge of the destination activity.

Although the example in FIG. 6 shows a flow for exerting control so that only the latest output among multiple printed results of the same electronic document is approved as valid, and that only the person in charge of the destination activity may return the printed result to the workflow instance, this is only one example. Alternatively, for example, only the first printed result may be regarded as valid, and returned to the workflow instance. Further, the system may also be controlled so that the printed result read first may be returned to the workflow instance as a valid document on the "first come, first served" basis. Depending on the destination activity, multiple printed results may be incorporated. In such a case, versions of the images resulting from reading multiple printed results may be managed and registered with the destination activity to thereby specify the order in which the documents are read.

For registering the image of the read document with the destination, the original electronic document file (the printed electronic document) may be deleted and the read image file may be registered to replace the original file, thereby conserving the disk capacity of the system. If the disk capacity is sufficient, it may be the case that the original electronic document file is not deleted and the read image file is additionally registered. When the electronic document management section 12 has a function of managing versions of a document, the image thus read may be registered as a new version of the original electronic document when the former is registered in addition to the latter.

Examples of the information items that may be embedded into the code image and the control achievable using such items are as described above, and those skilled in the art can understand that the above-described control can be executed by the assignment management section 26 and the workflow management section 10 using information in such items.

Although in the above example the information items of a record shown in FIG. 5 is embedded into the code image, record identification information uniquely specifying a record may instead be embedded into the code image. In such a case, the information items, such as the workflow ID and the destination activity ID, may be specified by retrieving from the assignment information storage section 28 the record identification information recognized from the code image. Thus, as understood by those skilled in the art, the information item itself, such as the workflow ID or the destination activity ID, need not be embedded in the code image, and the only requirement is to embed the data uniquely specifying such necessary information items. The record identification information may be uniquely assigned by the workflow management section 10 or the assignment information storage section 28. Alternatively, a pair consisting of printer ID of the printer printing the electronic document and the total number of documents printed out by the printer may be used as the record identification information (in this case, the total number of documents printed out by the printer is registered as one information item of the record in the assignment information storage section 28).

Further, although in the above example the assignment management section 26 provides the workflow management section 10 with the image of the document read by the reader section 22 together with the destination ID indicated by the code image (either the workflow ID or the destination activity ID, or both thereof), alternatively, information indicating the location (such as a URL) where the image of the read document is stored may be provided to the workflow management section 10 to thereby be incorporated into the workflow instance.

Further, instead of placing the image read by the reader section 22 into the workflow instance, data resulting from a predetermined process, such as a character recognition process and a summarization process, performed on the image may be incorporated.

In the above example, the code information production section 16 produces a code image on the basis of the information supplied from the workflow management section 10. Instead of thus producing a code image, the code information production section 16 may store a multitude of code images in a database, so that the code image corresponding to the information received from the workflow management section 10 can be read from the database, and printed with the electronic document.

Figure 7:
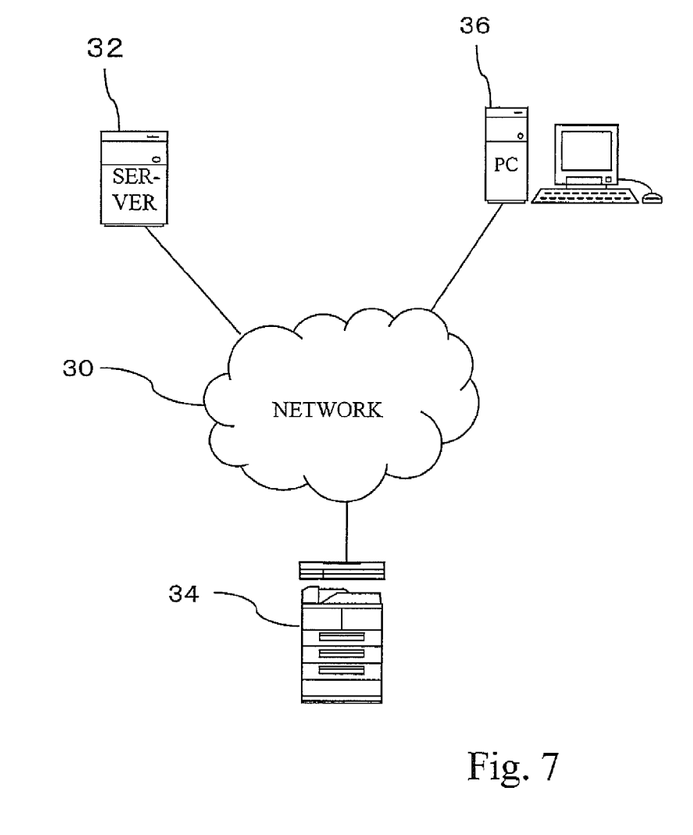
FIG. 7 shows an example hardware configuration of the workflow support system.

The workflow support system described above may be implemented, for example, as a combination of a server 32 and an multifunction device (MFD) 34 that can communicate with each other (or directly connected over a dedicated communication cable) via a network 30, such as Internet or a LAN. In one example system configuration, the server 32 performs the functions of the workflow management section 10, the electronic document management section 12, the display section 14, the code information production section 16, the print control section 18, and the assignment management section 26 among the system components illustrated in FIG. 1 or FIG. 4. The MFD 34 performs the functions of the printer 20, the reader section 22, and the code recognition section 24. The function of the code recognition section 24 may be performed by the server 32. The function of the print control section 18 may be performed by the MFD 34.

The MFD 34 printing electronic documents and code images is not necessarily the same MFD 34 reading the documents and images. Naturally, the printing device may be a simple printer rather than an MFD, and the reading device may be a simple scanner rather than an MFD.

Figure 8:
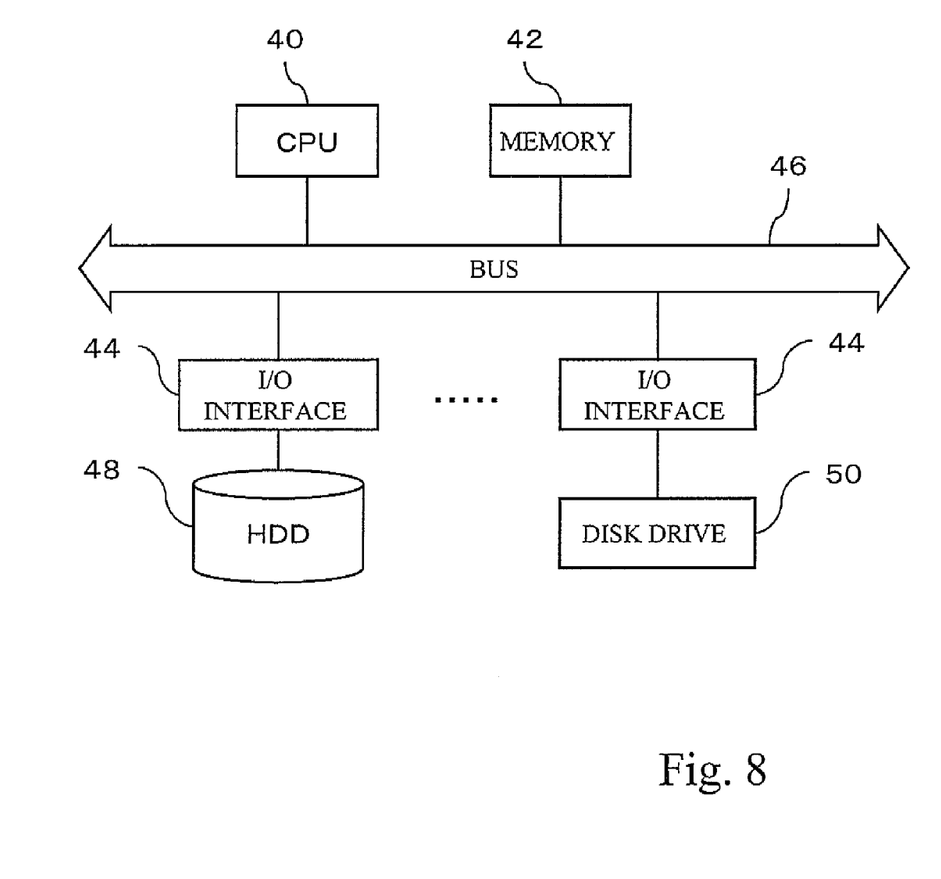
FIG. 8 shows an example hardware configuration of a server in the workflow support system.

The server 32 is implemented by executing, by means of a general-purpose computer system, a program describing functions of the workflow management section 10, the electronic document management section 12, the code information production section 16, and the assignment management section 26 described above. As shown in FIG. 8, the computer system has a circuit configuration including as hardware a CPU (central processing unit) 40, a memory (primary storage) 42, various I/O (input/output) interfaces 44, and the like connected via a bus 46. To the bus 46, for instance, a HDD (hard disk drive) 48, and a disk drive 50 for reading a mobile non-volatile storage medium complying with various standards, such as a flash memory, a CD, and a DVD, are connected through the I/O interface 44. Such a drive 48 or 50 functions as a storage device external to the memory. The program describing the process contents of the above-described embodiment is stored in such an external storage device, and installed in the computer system. The program stored in the external storage device is read out and loaded into the memory 42, and executed by the CPU 40, thereby implementing the process of the above-described embodiment.

Although the program for the server 32 may be developed as the program having all the functions of the workflow management section 10, the electronic document management section 12, the code information production section 16, and the assignment management section 26 described above, an existing program may be used for the workflow management section 10 and the electronic document management section 12 among these sections. In such a case, the functions of the code information production section 16 and the assignment management section 26 may be, for example, developed as so-called plug-ins, and incorporated into the program for the workflow management section 10.

Although in the example illustrated in FIG. 7 the functions of the workflow management section 10, the electronic document management section 12, the code information production section 16, and the assignment management section 26 are implemented in a single server 32, these functions may be distributed to multiple servers on the network 30 operating in cooperation to implement the above-described workflow support system.

In the present specification, the phrase "associating" the image of the read electronic document or data resulting from a predetermined process performed on the image with a destination identified by identification information recognized from a code refers both to supplying the image or data to the destination and supplying to the destination a location where the image or data are stored.

Each of the operations which forms a workflow and is be performed by a person is referred to as an "activity" or a "task." After a person in charge of a certain activity has finished performing his/her assigned process on the target electronic document, the workflow support system passes the resulting electronic document to a person in charge of the next activity.

Although exemplary embodiments of the present invention has been described in its form with a certain degree of particularity using specific examples, it is to be understood that the invention is not limited thereto. It is to be further understood by those skilled in the art that various changes and modifications may be made to the invention without departing from the spirit and scope thereof.

What is claimed is:

1. A workflow processing system, comprising:
   a print control section that, upon receiving an instruction to print an electronic document used in a workflow, causes a printing device to print, together with the electronic document, identification information for identifying the workflow or an activity of the workflow, the workflow or the activity is a destination to which an image resulting from reading a printed result of the electronic document is to be taken;
   an identifier recognition section that recognizes the identification information read by an image reading device;
   an association section that associates the image of the electronic document read in association with the identification information by the image reading device or data resulting from a process performed on the image with the destination identified by the recognized identification information; and
   a recording section that records time when the printing device is caused to print the identification information or information indicating an order of printing of the identification information;
   said association section specifying an image corresponding to a latest printed result among a plurality of images of the electronic document read in association with the identification information and corresponding to the same destination on the basis of the record of time when the identification information is printed or the information on the order and associating the specified image with the destination.

2. The system according to claim 1, wherein the association section associates with the destination the image resulting from reading one printed result satisfying a predetermined condition among a plurality of printed results of the same electronic document.

3. The system according to claim 1, wherein the association section associates with the destination the images resulting from reading a plurality of printed results of the same electronic document together with the information on the order the results are read or printed out.

4. The system according to claim 1, wherein the print control section causes the printing device to print the identification information with an invisible color material.

5. The system according claim 1, wherein the association section associates the destination with the image of the electronic document read by the image reading device to replace an original file of the electronic document.

6. The system according to claim 1, wherein the association section associates the image of the electronic document with the destination as a file different from an original file of the electronic document.

7. The system according to claim 1, wherein the association section associates the image of the electronic document with the destination as a new version of the electronic document.

8. The system according to claim 1, wherein the print control section causes the printing device to print, together with the identification information, information indicating a person in charge of the activity of the destination.

9. The system according to claim 1, wherein the print control section causes the printing device to print, together with the identification information, description of an operation to be performed by a user on the printed result of the electronic document.

10. A workflow processing method executed by a computer, comprising:
   causing, upon receiving an instruction to print an electronic document used in a workflow, a printing device to print, together with the electronic document, identification information for identifying the workflow or an activity of the workflow, the workflow or the activity is a destination to which an image resulting from reading a printed result of the electronic document is to be taken;
   recognizing the identification information read by an image reading device; and
   associating the image of the electronic document read in association with the identification information by the image reading device or data resulting from a process performed on the image with the destination identified by the recognized identification information;
   recording time when the printing device is caused to print the identification information or information indicating an order of printing of the identification information;
   specifying an image corresponding to a latest printed result among a plurality of images of the electronic document read in association with the identification information and corresponding to the same destination on the basis of the record of time when the identification information is printed or the information on the order; and
   associating the specified image with the destination.

11. The method according to claim 10, wherein the causing a printing device to print comprises causing the printing device to print the identification information with an invisible color material.

12. The method according to claim 10, wherein the causing a printing device to print comprises causing the printing device to print, together with the identification information, information indicating a person in charge of the activity of the destination.

13. The method according to claim 10, wherein the causing a printing device to print comprises causing the printing device to print, together with the identification information, description of an operation to be performed by a user on the printed result of the electronic document.

14. A storage medium readable by a computer, the storage medium storing a program of instructions executable by the computer to perform a function for workflow management, the function comprising:
   causing, upon receiving an instruction to print an electronic document used in a workflow, a printing device to print, together with the electronic document, identification information for identifying the workflow or an activity of the workflow, the workflow or the activity is a destination to which an image resulting from reading a printed result of the electronic document is to be taken;
   recognizing the identification information read by an image reading device; and
   associating the image of the electronic document read in association with the identification information by the image reading device or data resulting from a process performed on the image with the destination identified by the recognized identification information;
   recording time when the printing device is caused to print the identification information or information indicating an order of printing of the identification information;
   specifying an image corresponding to a latest printed result among a plurality of images of the electronic document read in association with the identification information and corresponding to the same destination on the basis of the record of time when the identification information is printed or the information on the order; and
   associating the specified image with the destination.

15. The storage medium according to claim 14, wherein the causing a printing device to print comprises causing the printing device to print the identification information with an invisible color material.

16. The storage medium according to claim 14, wherein the causing a printing device to print comprises causing the printing device to print, together with the identification information, information indicating a person in charge of the activity of the destination.

17. The storage medium according to claim 14, wherein the causing a printing device to print comprises causing the printing device to print, together with the identification information, description of an operation to be performed by a user on the printed result of the electronic document.

* * * * *